United States Patent
Benini (10) Patent No.: US 11,250,078 B2
(45) Date of Patent: *Feb. 15, 2022

(54) RELATIONSHIP DETECTION WITHIN BIOMETRIC MATCH RESULTS CANDIDATES

(71) Applicant: AWARE, INC., Bedford, MA (US)

(72) Inventor: David Benini, Charlestown, MA (US)

(73) Assignee: AWARE, INC., Bedford, MA (US)

( * ) Notice: Subject to any disclaimer, the term of this patent is extended or adjusted under 35 U.S.C. 154(b) by 237 days.

This patent is subject to a terminal disclaimer.

(21) Appl. No.: 16/688,269

(22) Filed: Nov. 19, 2019

(65) Prior Publication Data

US 2020/0089715 A1 Mar. 19, 2020

Related U.S. Application Data (63) Continuation of application No. 15/612,276, filed on Jun. 2, 2017, now Pat. No. 10,521,478, which is a
(Continued)

(51) Int. Cl.
*G06F 16/215* (2019.01)
*G06F 16/951* (2019.01)
(Continued)

(52) U.S. Cl.
CPC .......... *G06F 16/951* (2019.01); *G06F 16/215* (2019.01); *G07C 9/37* (2020.01); *G06F 21/32* (2013.01); *G07C 9/38* (2020.01)

(58) Field of Classification Search
CPC ....... G06F 16/215; G06F 16/951; G06F 21/32
See application file for complete search history.

(56) References Cited

U.S. PATENT DOCUMENTS 5,613,012 A 5/1997 Hoffman et al.
5,805,719 A 9/1998 Pare, Jr. et al.
(Continued)

FOREIGN PATENT DOCUMENTS

WO WO 2007/143178 12/2007

OTHER PUBLICATIONS

International Search Report for International Application No. PCT/US2011/062770, dated Jul. 18, 2012.
(Continued)

*Primary Examiner* — Merilyn P Nguyen
(74) *Attorney, Agent, or Firm* — Jason H. Vick; Sheridan Ross, PC (57) ABSTRACT

Systems and methods for enhancing confidence in a biometric search result include submitting one or more biometric samples to a biometric search engine. In response to the one or more submitted biometric samples, a plurality of candidates identified as potentially associated with the one or more submitted biometric samples is received from the biometric search engine. Each identified candidate has associated biographic information. The biographic information associated with each identified candidate is submitted to a relationship detection engine. In response to the submitted biographic information, an identified relationship between at least one of the identified candidates and one or more other individuals is received from the relationship detection engine.

19 Claims, 6 Drawing Sheets

Related U.S. Application Data continuation of application No. 13/988,057, filed as application No. PCT/US2011/062770 on Dec. 1, 2011, now Pat. No. 9,984,157.

(60) Provisional application No. 61/418,573, filed on Dec. 1, 2010.

(51) Int. Cl.
*G07C 9/37* (2020.01)
*G06F 21/32* (2013.01)
*G07C 9/38* (2020.01)

(56) References Cited

U.S. PATENT DOCUMENTS

| | | | |
|---|---|---|---|
| 5,870,723 A | 2/1999 | Pare, Jr. et al. | |
| 6,105,010 A | 8/2000 | Musgrave | |
| 7,278,028 B1 | 10/2007 | Hingoranee | |
| 7,702,918 B2* | 4/2010 | Tattan | H04L 69/329 |
| | | | 713/186 |
| 7,912,842 B1 | 3/2011 | Bayliss | |
| 7,929,733 B1 | 4/2011 | Lehnert et al. | |
| 8,041,956 B1 | 10/2011 | White et al. | |
| 8,209,752 B2* | 6/2012 | Ohta | G07C 9/37 |
| | | | 726/19 |
| 8,520,903 B2 | 8/2013 | Gupta et al. | |
| 8,649,570 B2* | 2/2014 | Abiko | G06K 9/00912 |
| | | | 382/115 |
| 8,670,597 B2 | 3/2014 | Petrou et al. | |
| 9,646,197 B2* | 5/2017 | Benini | G06K 9/00288 |
| 9,984,157 B2 | 5/2018 | Benini | |
| 2003/0126121 A1 | 7/2003 | Khan et al. | |
| 2003/0149744 A1 | 8/2003 | Bierre et al. | |
| 2004/0001142 A1 | 1/2004 | Kumhyr | |
| 2004/0133582 A1 | 7/2004 | Howard et al. | |
| 2006/0104485 A1 | 5/2006 | Miller, Jr. et al. | |
| 2006/0222211 A1 | 10/2006 | Olivo, Jr. et al. | |
| 2007/0036395 A1 | 2/2007 | Okun | |
| 2007/0078908 A1 | 4/2007 | Rohatgi et al. | |
| 2007/0100622 A1 | 5/2007 | Tavares | |
| 2007/0239782 A1 | 10/2007 | Schneider | |
| 2008/0025572 A1* | 1/2008 | Schneider | G06K 9/00 |
| | | | 382/115 |
| 2009/0174526 A1 | 7/2009 | Howard et al. | |
| 2010/0232653 A1 | 9/2010 | MuQuit et al. | |
| 2010/0241634 A1 | 9/2010 | Madhok | |
| 2011/0032076 A1 | 2/2011 | Rickman | |
| 2011/0007143 A1 | 6/2011 | Mugica et al. | |
| 2011/0188709 A1 | 8/2011 | Gupta et al. | |
| 2012/0089606 A1 | 4/2012 | Eshwar et al. | |
| 2012/0139703 A1 | 6/2012 | Szoke et al. | |
| 2012/0194418 A1* | 8/2012 | Osterhout | G02B 27/0149 |
| | | | 345/156 |
| 2017/0337278 A1 | 11/2017 | Benini | |

OTHER PUBLICATIONS

Written Opinion for International Application No. PCT/US2011/062770, dated Jul. 18, 2012.
International Preliminary Report on Patentability for International Application No. PCT/US2011/062770, dated Jun. 13, 2013.
Office Action for U.S. Appl. No. 13/988,057, dated Jan. 29, 2015.
Office Action for U.S. Appl. No. 13/988,057, dated Jun. 3, 2015.
Office Action for U.S. Appl. No. 13/988,057, dated Jan. 13, 2016.
Office Action for U.S. Appl. No. 13/988,057, dated May 19, 2016.
Office Action for U.S. Appl. No. 13/988,057, dated Nov. 17, 2016.
Notice of Allowance for U.S. Appl. No. 13/988,057, dated Feb. 13, 2017.
Office Action for U.S. Appl. No. 13/988,057, dated Oct. 19, 2017.
Notice of Allowance for U.S. Appl. No. 13/988,057, dated Feb. 27, 2018.
Office Action for U.S. Appl. No. 15/612,276, dated Jul. 23, 2019.
Notice of Allowance for U.S. Appl. No. 15/612,276, dated Sep. 13, 2019.

* cited by examiner

RELATIONSHIP DETECTION WITHIN BIOMETRIC MATCH RESULTS CANDIDATES

RELATED APPLICATIONS

This application is a Continuation of U.S. patent application Ser. No. 15/612,276, filed Jun. 2, 2017, now U.S. Pat. No. 10,521,478, which is a Continuation of U.S. patent application Ser. No. 13/988,057, filed May 17, 2013, now U.S. Pat. No. 9,984,157, which is a national stage application under 35 U.S.C. 371 of PCT Application No. PCT/US2011/062770, having an international filing date of Dec. 1, 2011, which designated the United States, which PCT application claims the benefit of U.S. Provisional Application No. 61/418,573, filed on Dec. 1, 2010, titled "Relationship Detection within Biometric Match Results Candidates," each of which are incorporated herein by reference in their entirety

FIELD OF THE INVENTION

The invention relates generally to biometric systems used for person identification. More specifically, the invention relates to biometric systems and methods that detect relationships between biometric match results candidates to improve confidence in person identifications.

BACKGROUND

Biometric databases can be useful for criminal investigation. A biometric database comprises records, each of which contains biometric sample data and associated biographic data. For example, when booking a criminal suspect, a police agency collects biometrics (e.g., fingerprints, iris, "mug shot", DNA,) and biographic information, such as a name, address, height, weight, etc. The collected biometrics and biographics are stored together as a database record. Further, a criminal investigation may recover latent biometric samples from a crime scene, which are submitted later to an automated biometric identification system (ABIS). The biometric identification system algorithmically compares the latent biometric samples to records in the biometric database in an attempt to ascertain the source individual or individuals of the latent biometric samples.

The mechanism of biometric matching, however, is probabilistic in nature, and does not attempt to yield 100% certainty in identification. For example, a biometric search typically does not yield a certain match, but rather a ranked candidate list, which highly trained forensic specialists then review manually. The biometric search results, however, can be inconclusive, particularly when the latent biometric sample is of poor quality.

SUMMARY

In one aspect, the invention features a method of enhancing confidence in a biometric search result. The method comprises submitting one or more biometric samples to a biometric search engine. In response to the one or more submitted biometric samples, a plurality of candidates identified as potentially associated with the one or more submitted biometric samples is received from the biometric search engine. Each identified candidate has biographic information associated therewith. The biographic information associated with each identified candidate is submitted to a relationship detection engine. In response to the submitted biographic information, an identified relationship between at least one of the identified candidates and one or more other individuals is received from the relationship detection engine.

In another aspect, the invention features a computer system comprising memory storing an application program, and a processor running the application program stored in the memory. The application program is configured to submit one or more biometric samples to a biometric search engine, to receive from the biometric search engine, in response to the one or more submitted biometric samples, a plurality of candidates potentially associated with the one or more biometric samples, to submit biographic information associated with each identified candidate to a relationship detection engine, and to receive from the relationship detection engine, in response to the submitted biographic information, an identified relationship between at least one of the identified candidates and one or more other individuals.

In still another aspect, the invention features a computer program product for enhancing confidence in a biometric search result. The computer program product comprises a computer readable storage medium having computer readable program code embodied therewith. The computer readable program code comprising computer readable program code configured to submit one or more biometric samples to a biometric search engine, computer readable program code configured to receive from the biometric search engine, in response to the one or more submitted biometric samples, at least one candidate identified as potentially associated with the one or more biometric samples. Each identified candidate has biographic information associated therewith. The computer readable program code further comprises computer readable program code configured to submit the biographic information associated with each identified candidate to a relationship detection engine, and computer readable program code configured to receive from the relationship detection engine, in response to the submitted biographic information, an identified relationship between at least two of the biometrically identified candidates.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Automated biometric systems described herein integrate biometric identification technologies with relationship detection technologies to improve confidence in biometric search results. Applicant recognized that the biographics associated with a biometric match do not necessarily improve the confidence in the biometrics match (e.g., such biographic information could be false, incorrect, conflicting, ambiguous, outdated, etc.). Notwithstanding, the applicant also recognized another application for the biographics that could improve confidence in the biometric results, namely, through relationship detection.

In general, relationship detection is a mechanism that employs public and private data records in text-based databases to identify non-obvious relationships between individuals. The biographics of biometric match candidates and, in some instances, victims can be used to search these relationship-detection databases for relationships between candidates and between candidates and victims. Any detected relationships provide context for the biometric search that identified the candidates, thereby helping interpret what could be an otherwise inconclusive biometric search. Advantageously, the integration of biometric identification with relationship detection operates to lower error rates (missed identifications and misidentifications), to enable working with larger population sizes, to improve robustness with respect to missing or degraded biometric samples, to increase security with respect to spoofing, and to reduce the failure-to-enroll rate.

Figure 1:
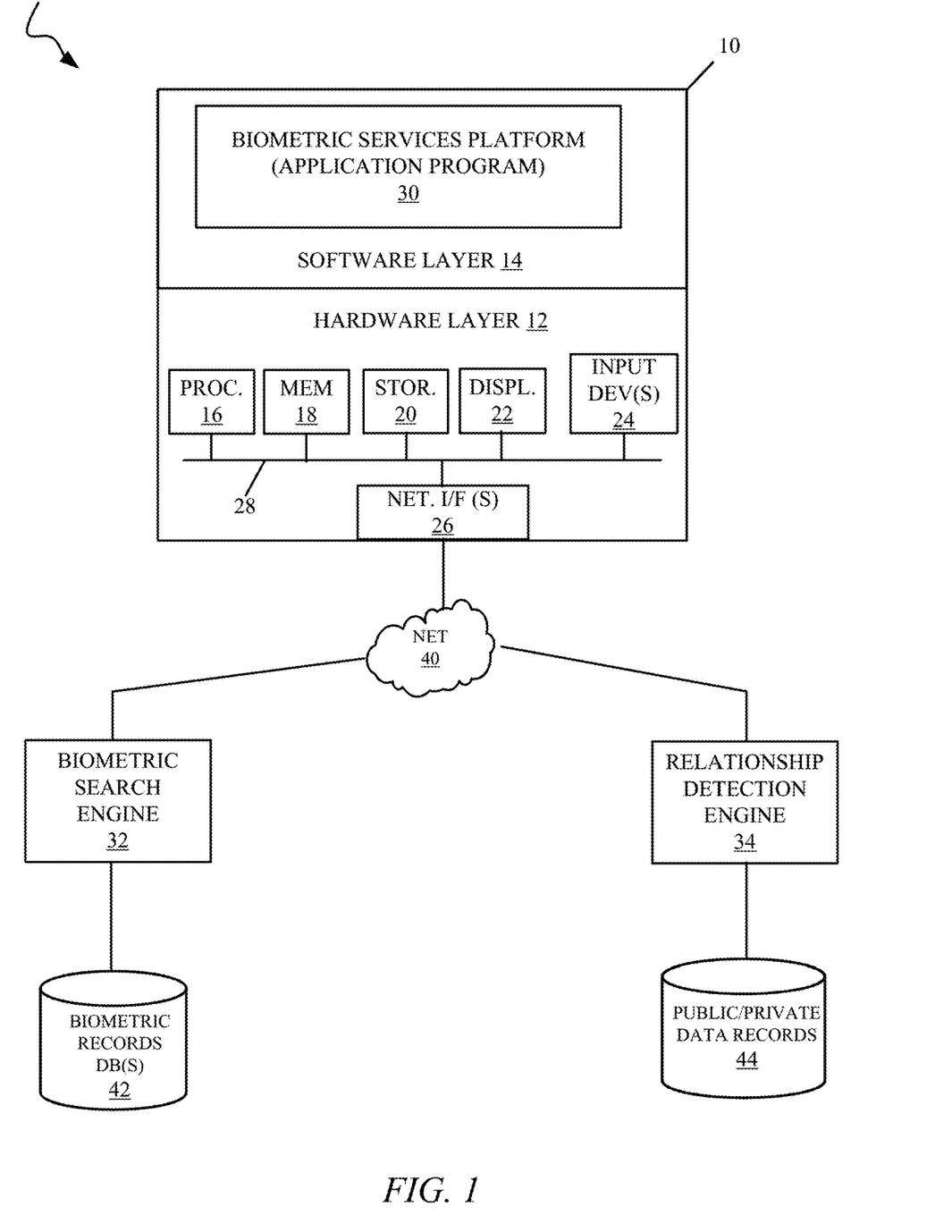
FIG. 1 is block diagram of an embodiment of a biometric identification system.

FIG. 1 shows a functional block diagram of an embodiment of a biometric system 2 including a computer system 10 configured to improve the confidence in a biometric result as described herein. Example implementations of the computer system 10 include, but are not limited to, computers (PCs and Macintosh), workstations, servers, handheld devices, such as personal digital assistants (PDA), cellular phones, smartphones, Apple iPods™ and iPads™ Amazon KINDLES®, mobile phones, kiosks, and network terminals. The computer system 10 generally comprises a hardware layer 12 and a software layer 14.

The hardware layer 12 includes a processor 16, memory 18, storage 20, a display screen 22, user input device(s) 24, and a network interface 26. The processor 16 can be a proprietary or conventional cache-based machine, employing hardware logic, software logic, or a combination thereof in the performance of its processing tasks, such as memory access, communication-related processing, arithmetic/logical operations, and control.

The memory 18 includes non-volatile computer storage media, such as read-only memory (ROM), and volatile computer storage media, such as random-access memory (RAM). Typically stored in the ROM is a basic input/output system (BIOS), which contains program code for controlling basic operations of the computing system 10 including start-up of the computing device and initialization of hardware. Stored typically within the RAM are data and executing program code, such as application programs and program modules (e.g., DLLs or dynamic link libraries).

Storage 20 includes internal or external (or both) persistent storage devices, such as hard disk drives, SATA (serial advanced technology attachment), USB (Universal Serial Bus) devices, and network attached storage (NAS). The storage 20 can be used for persistent storage of data, databases, and files.

The display screen 22 is an electronic visual display for the computer system 10. Depending on the type of the computer system 10, embodiments of the computer screen 22 include, but are not limited to, a monitor, flat-panel screen, and touch-screen.

In general, the user-input device 24 can be any peripheral device used to provide data and control signals to the computer system 10. Example embodiments of the user-input device(s) include, but are not limited to, a keyboard, a mouse, trackball, touch-pad, touch-screen, graphics tablet, microphone, light pen, joystick, heat-mapping devices, and eye-gaze tracking devices.

The network interface 26 connects the computer system 10 to a network 40, which may be a local area network, a wide-area network such as the Internet or World Wide Web. The computer system 10 can connect to the network 40 through one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)).

A signal bus 28 interconnects the various hardware components of the computer system 10. In addition, the signal bus 28 can connect to various other components (not shown) of the computer system 10 including, for example, a memory interface, a peripheral interface (e.g., to a printer, to a CD-ROM drive), and a video interface. Although shown as a single bus 28, the signal bus 28 can comprise multiple separate busses. Example implementations of the signal bus 28 include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus.

The software layer 14 includes an application program 30 configured to provide a biometric services platform, as described herein. The application program 30 is configured to communicate with a biometrics search engine 32 for performing biometric searches based on submitted biometric samples. The biometrics search engine 32 can be embodied in an automated biometric identification system (ABIS). An example implementation of an ABIS system is the Department of Defense Next-Generation ABIS (NG-ABIS). In the embodiment shown in FIG. 1, the application program 30 communicates with the biometrics search engine 32 over the network 40; in other embodiments, the biometrics search engine 32 can be part of the application program 30.

The biometrics search engine 32 is in communication with one or more biometric records databases 42 containing the biometric records of numerous subjects from whom biometric data, such as fingerprints, DNA, iris images, has been collected. An example implementation of the biometrics records database 42 is the Department of Defense's Automated Biometric Identity System (ABIS) database.

The application program 30 is also configured to communicate with a relationship-detection engine 34 for searching for relationships among individuals based on submitted biographic information. An example implementation of the relationship-detection engine 34 is the Identity Resolution Engine 2.2, produced by Infoglide Software of Austin, Tex. In the embodiment shown in FIG. 1, the application program 30 communicates with the relationship-detection engine 34 over the network 40; in other embodiments, the relationship-detection engine 34 can be part of the application program 30.

The relationship-detection engine 34 is in communication with one or more databases 44 (public, private, or both) containing text-based records of individuals. Examples of such records include, but are not limited to, addresses, telephone directories, telephone call records, bank records, voter registration records, credit records, criminal records, marriage records, tax records, social security databases, social media data, and other publicly posted information that establishes links between individuals.

Figure 2:
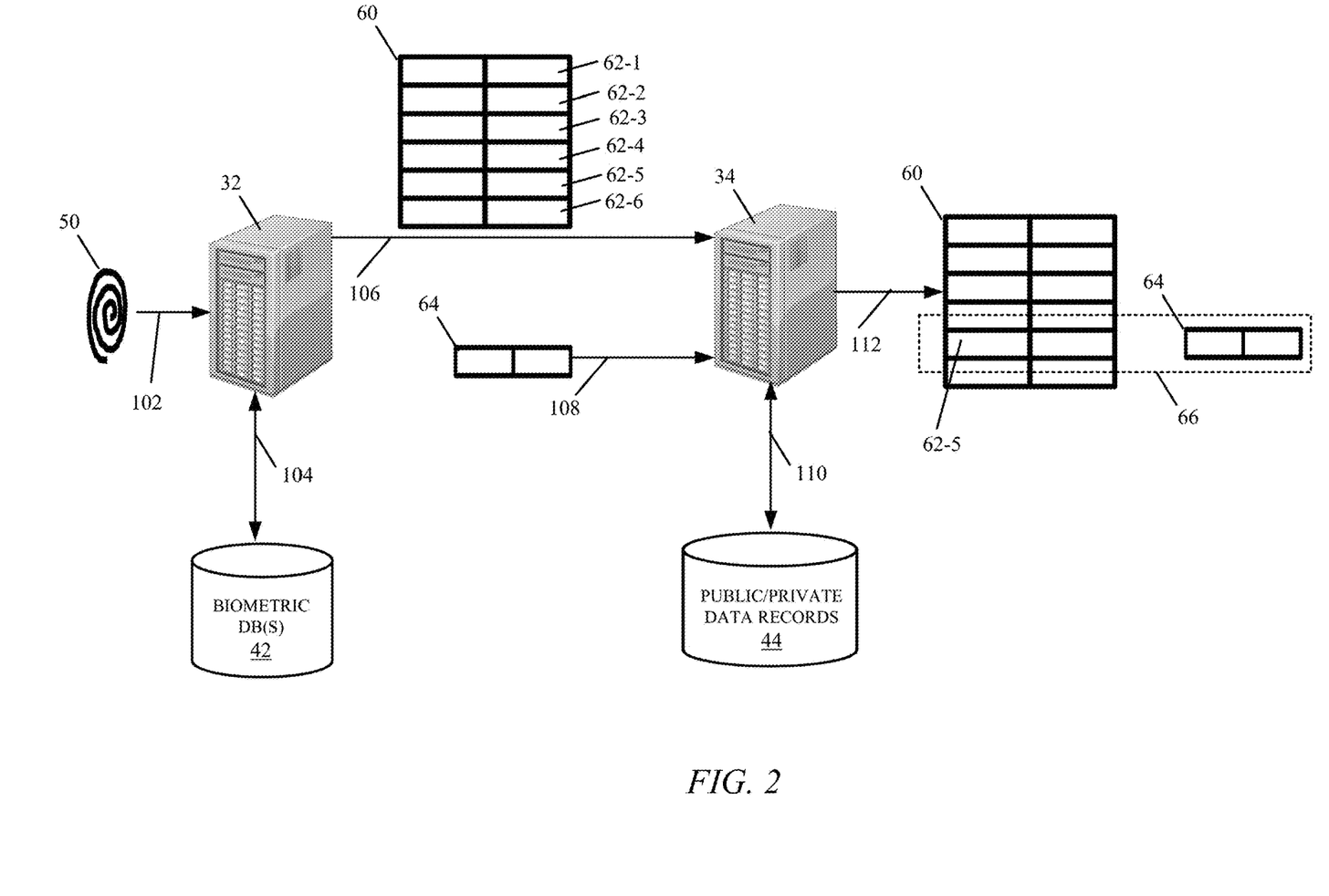
FIG. 2 is a block diagram showing use of the biometric identification system to enhance confidence in a biometric search result by detecting relationships between one or more candidates (biometrically identified as being associated with a biometric sample) and a person of interest.
Figure 3:
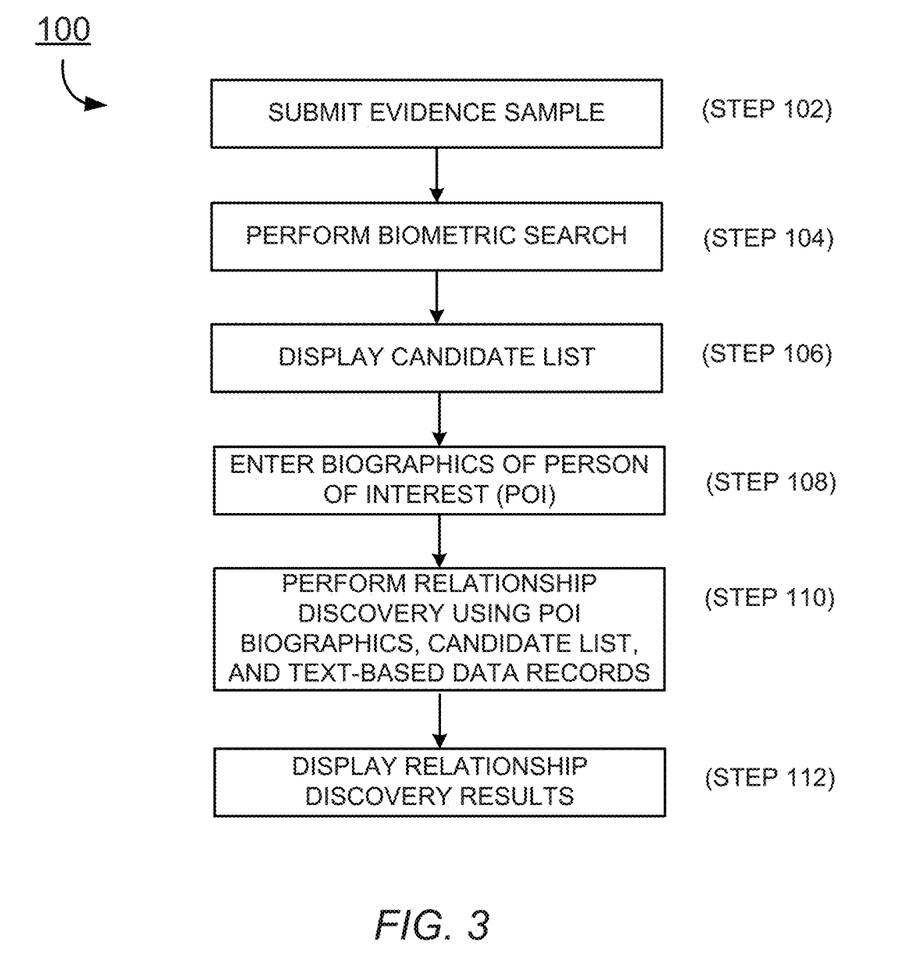
FIG. 3 is a flow diagram of an embodiment of a process for enhancing confidence in a biometric search result by detecting relationships between one or more candidates and a person of interest.

FIG. 2 and FIG. 3 show an embodiment of a process 100 for enhancing confidence in a biometric search result by detecting relationships between one or more candidates (biometrically identified as being associated with a biometric sample) and a person of interest. Consider, for example, that a single latent biometric sample or sample set (e.g., a digitized image of a fingerprint) is acquired from a crime scene with a known victim (i.e., the person of interest). This latent biometric sample can be of low quality, leading a biometric search of the biometric database 42 to yield inconclusive results (e.g., numerous candidates with similar match scores).

A user of the computer system 10 runs the application program 30 and submits (step 102) the sample 50, exemplified in FIG. 2 as a fingerprint. The application program 30 communicates with the biometrics search engine 32 to perform a search based on this biometric sample 50, and the biometrics search engine 32 communicates with the biometric records database 42 to perform (step 104) the search. The search of the biometrics database 42 produces a list 60 of multiple records having match scores above a threshold. Such match scores correspond to the likelihood of a match being found for the sample 50. Each record is associated with a candidate, namely, a possible source of the biometric sample, and contains biographic information about the candidate. In this example, the list 60 includes six match candidates 62-1, 62-2, 62-3, 62-4, 62-5, and 62-6 (generally 62), which can be ranked in order from best to worst matches. A resulting list 60 can have more or fewer than the six candidates shown. The biometrics search engine 32 returns the list 60 to the application program 30, which displays (step 106) the list 60 to the user. The user can visually review and possibly edit this list (e.g., to remove a candidate).

The application program 30 submits this list 60 of candidates 62, and text-based biographic information associated with these candidates, to the relationship detection engine 34. In addition to the list 60, the user submits (step 108) biographic information about a person of interest 64 (e.g., the victim) to the relationship detection engine 34. Such biographic information can include, but not be limited to, such data as name, date of birth, physical characteristics, such as eye color, hair color, height and weight, phone bills, residence records, and names of family members. Based on data records stored in the private/public databases 44, the submitted biographics of the POI 64, and the submitted biographics of the candidates 62 in the list 60, the relationship detection engine 34 searches for (step 110) relationships (links) between any of the candidates 62 in the list 60 and the POI 64. The relationship detection engine 34 returns ranked matches indicating the presence (i.e., existence), nature (e.g., they share an address), and probability (i.e., confidence level) of an association between one or more candidates in the list with the POI 64. The application program 30 displays (step 112) the result of the relationship detection search on the display screen 22. In this example, a relationship is discovered between the candidate 62-5 in the list 60 and the POI 64. The use of relationship detection thus enhances the biometric search results (i.e., improves the level of confidence in the results) by singling out a single candidate (here, e.g., candidate 62-5) who has a relationship with the POI 64.

Figure 4:
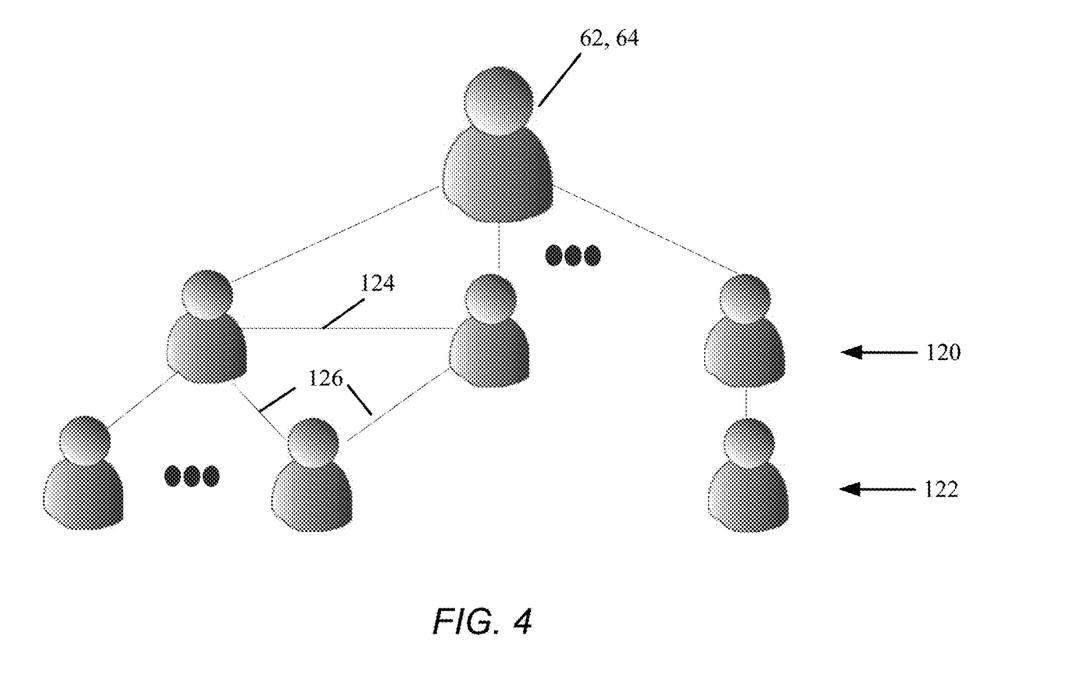
FIG. 4 is a diagram illustrating levels of associations for candidates and persons of interest.

The scope of relationship detection can extend beyond looking for direct links between candidates 62 and the POI 64. For instance, FIG. 4 shows an oversimplified example of a social network for each candidate 62 and person of interest 64. Each candidate 62 and POI 64 has one or more first-order associates 120 (e.g., relatives, individuals personally known or interacted with) and second-order associates 122 (i.e., first-order associates of the first-order associates 120). Some of the first-order associates 120 may have a first-order relationship with each other, as denoted by link 124, or share a common first-order associate, as denoted by links 126. The identities of known associates of the POI 64 may be acquired from various sources, examples of which include but are not limited to a laptop, a cell phone, and cell phone call records. The identities of known associates of the candidates 62 can be obtained from the relationship detection databases 44 and/or from the biographic information associated with the candidates in the list 60 produced by the biometrics search engine 32.

In some embodiments, the relationship detection process can also look for relationships between known associates (first order, second order, etc) of the POI 64 and each candidate 62 in the list 60, between the POI 64 and any of the known associates of the candidates 62, between any known associate of the POI 64 and any known associate of the candidates 62, or any combination thereof. The number of levels of association involved in the relationship detection process can be fewer or more than two. In general, the strength of a relationship can be inversely proportional to the degree of separation from the POI 64 or candidate 62 at which the relationship is detected.

Figure 5:
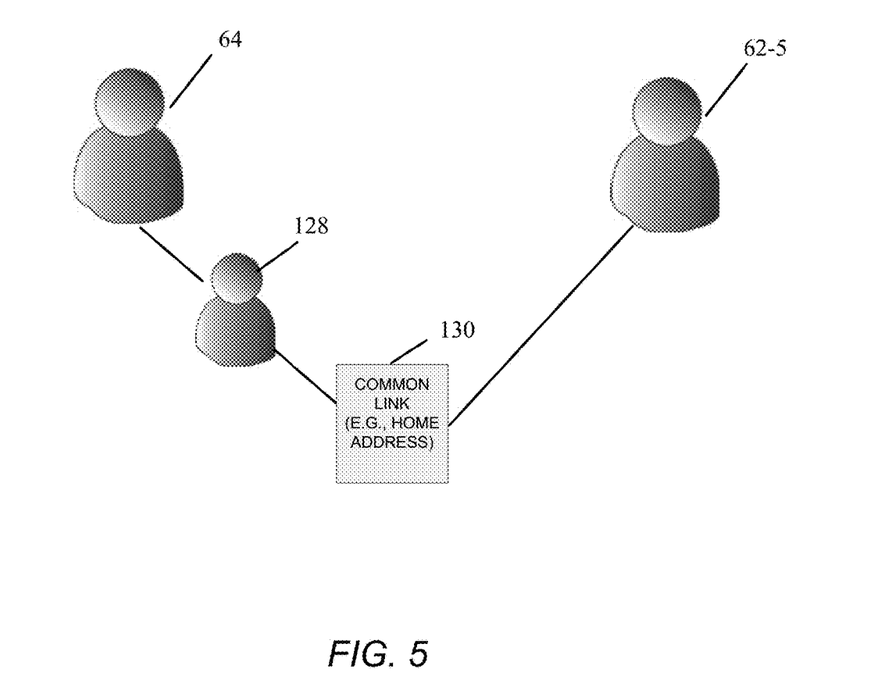
FIG. 5 is a diagram illustrating an example of a relationship detected between a person of interest and a candidate.

FIG. 5 shows a simple example of a detected relationship between the POI 64 and the candidate 62-5, the relationship being established through a first-order associate 128 of the POI 64. In this example, the first-order associate 128 and the candidate 62-5 share a commonality 130, for example, they have the same home address. This commonality 130 links the POI 64 and the candidate 62-5 (through the associate 128). Various types of commonalities can link individuals, examples of which include, but are not limited to, shared telephone calls, a common address of residence, place of business, a common employer, telephone numbers, attendance at the same high school or university, and registered for the same events, credit card purchases at the same stores, on the same or adjacent dates.

The application program 30 can produce a graphical representation of this relationship in a manner that facilitates an understanding of its existence and nature (e.g., by displaying the names of the individuals in the relationship, drawing links between the levels of association in the relationship, by identifying each commonality that establishes the relationship). Based on this identified relationship, a user can consider the candidate 62-5 to be the likeliest source of the biometric sample 50 leading to the candidate list 60.

Figure 6:
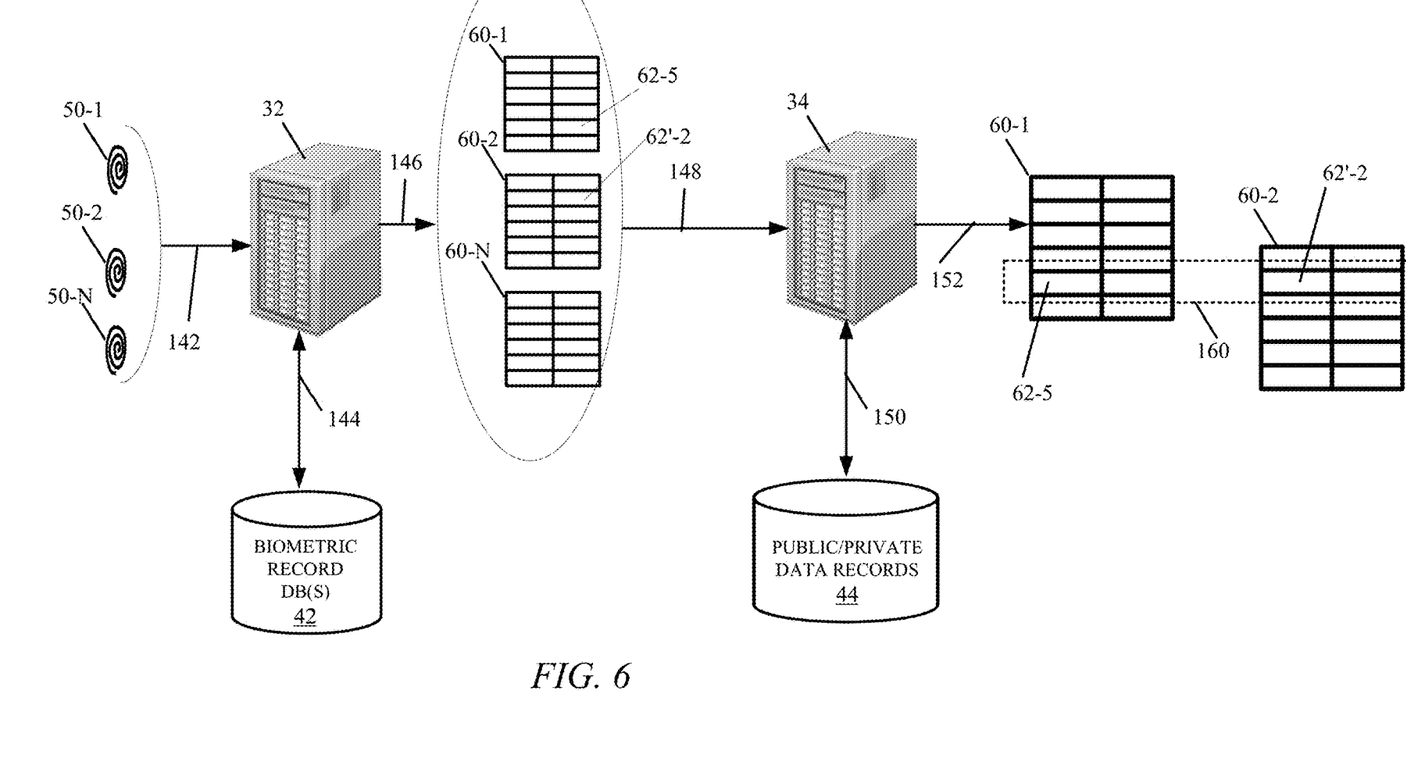
FIG. 6 is a block diagram showing another use of the biometric identification system to enhance confidence in a biometric search result by detecting relationships between candidates associated with different biometric samples collected under related circumstances or events.
Figure 7:
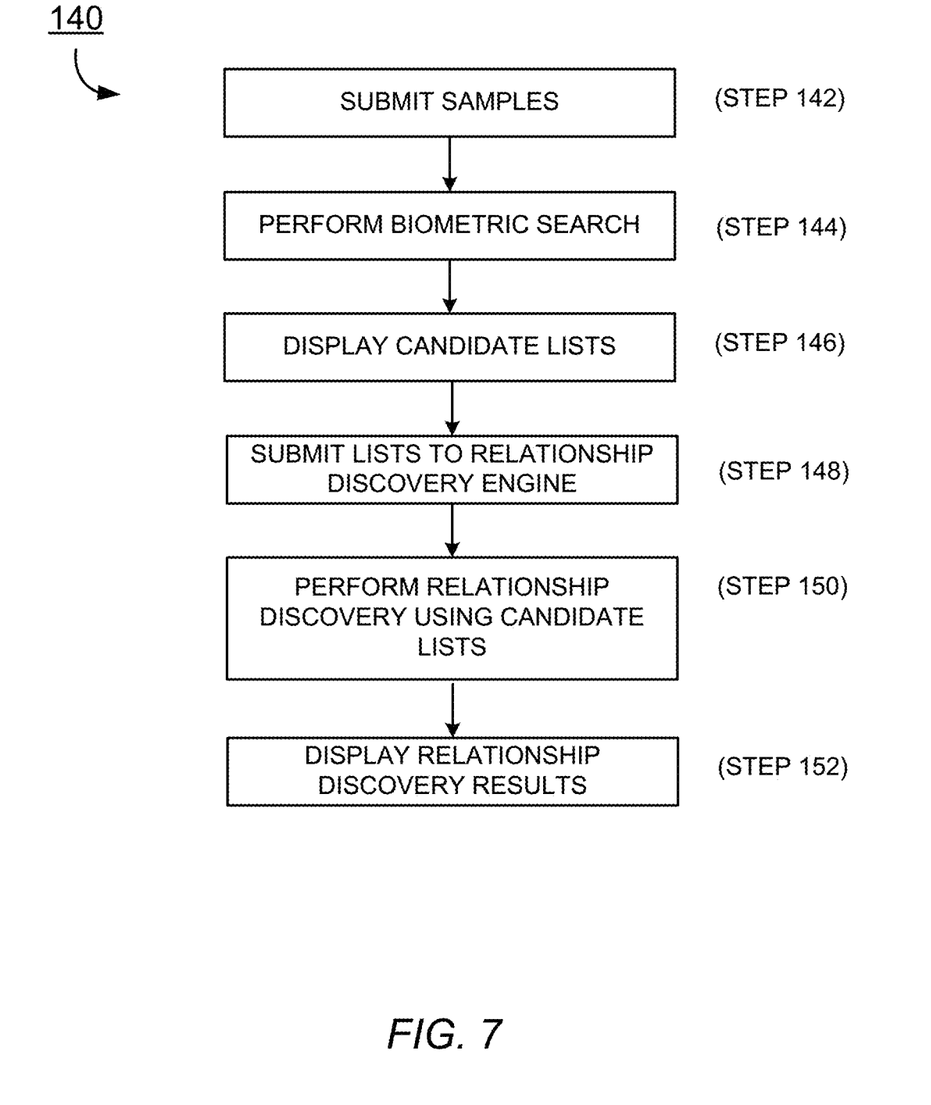
FIG. 7 is a flow diagram of an embodiment of another process for enhancing confidence in a biometric search result.

FIG. 6 and FIG. 7 show another embodiment of a process 140 for enhancing confidence in a biometric search result by detecting relationships between candidates associated with different biometric samples collected under related circumstances or events. Consider, for example, multiple latent biometric samples or sample sets are collected from a crime scene, such as a meeting place for illegal activity. In this example, there may be no known victim, and the criminals are unknown. Again, the latent biometric samples can be of low quality, leading a biometric search of the biometric database 42 to yield inconclusive results for each of the samples.

A user of the computer system 10 runs the application program 30 and submits (step 142) the collected biometric samples 50-1, 50-2, 50-N (generally, 50), exemplified in FIG. 6 as fingerprints. The application program 30 submits the samples 50 to the biometrics search engine 32 with instructions to search for matches for each of the samples 50. The biometrics search engine 32 searches (step 144) the biometrics database 42, producing lists 60-1, 60-2, 60-N (generally, 60) of candidates, one list 60 for each sample 50 (e.g., list 60-1 is associated with sample 50-1; list 60-2 is associated with sample 50-2). Each candidate 62 in each list 60 produces a matching score above a specified threshold for a match. The biometrics search engine 32 returns the lists 60 to the application program 30, and the application program 30 displays (step 146) the lists 60 of candidates on the display screen 22. Each list 60 can have more or fewer candidates than the six match candidates shown. The user can visually review and possibly edit this list (e.g., to remove a candidate).

The application program 30 submits (step 148) the lists 60 of candidates 62, and text-based biographic information associated with these candidates, to the relationship detection engine 34. The biographic information associated with each candidate can include, but not be limited to, the name, date of birth, phone bills, residence records, and names of family members of that candidate. Based on data records stored in the private/public databases 44 and the submitted biographics for each candidate 62 in each list 60, the relationship detection engine 34 searches for (step 150) relationships (links) between any two candidates 62 who are members of different lists. For example, the relationship detection engine 34 looks for a relationship between each candidate who is a member of list 60-1 and each candidate in the list 60-2, and also looks for a relationship between each candidate in list 60-1 and each candidate in list 60-N. Accordingly, if, for example, list 60-1 has ten candidates, list 60-2 has 5 candidates, and list 60-N has twenty candidates, then the relationship detection engine 34 searches for relationships between 50 (10×5) different pairs of candidates in lists 60-1 and 60-2, and 200 (10×20) different pairs of candidates in lists 60-1 and 60-N.

The relationship detection engine 34 returns ranked matches indicating the presence, nature, and probability of an association between candidates having a detected relationship. The application program 30 displays (step 152) the results of the relationship detection search on the display screen 22. In this example, a relationship 160 is detected between the candidate 62-5 in the list 60-1 and the candidate 62'-2 in the list 60-2. Although one detected relationship is shown, it is to be understood that the relationship detection engine 34 can uncover more than one relationship between candidates of different lists.

As described previously, the relationship detection process can be expanded to encompass associates, that is, to look for relationships: between known associates (first order, second order, etc) of a given candidate in one list and candidates 62 in the other lists 60; and between known associates of a given candidate in one list and known associates of the candidates 62 in the other lists.

The example application of relationship detection thus enhances the biometrics search results by finding non-obvious relationships between candidates biometrically identified with different biometric samples, such relationships otherwise potentially escaping notice. These detected relationships among the candidates can reveal, for example, members of an illegal organization.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C #, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method comprising:
receiving, at an automated biometric identification system, one or more biometric samples of one or more persons of interest;
providing, to a biometric search engine associated with access to one or more biometric records databases, the one or more biometric samples;
identifying, in the biometric search engine, and at least in response to the provided one or more biometric samples, a plurality of individuals identified as potentially associated with the provided one or more biometric samples, wherein each identified individual is associated with a record that includes biographic information;

receiving the biographic information associated with each of the identified individuals and user supplied biographic information about the one or more persons of interest at a relationship detection engine, the relationship detection engine identifying a relationship between the one or more persons of interest for which the one or more biometric samples were submitted and the plurality of identified individuals;

receiving, from the relationship detection engine, at least in response to submitted biographic information, at least one identified relationship between the one or more persons of interest for which the one or more biometric samples were submitted and the plurality of identified individuals; and displaying, on a display screen, the identified relationship, wherein the identified relationship at least improves a biometric search result by identifying the relationship between identified individuals biometrically identified with different biometric samples.

2. The method of claim 1, further comprising receiving biographic information about a known person of interest at the relationship detection engine, wherein the identified relationship is between at least one of the identified individuals and the known person of interest.

3. The method of claim 1, further comprising receiving biographic information about the one or more persons of interest and at least one known associate of the one or more persons of interest at the relationship detection engine, wherein the identified relationship is between at least one of the identified individuals and the at least one known associate of the one or more persons of interest.

4. The method of claim 1, further comprising:
receiving biographic information about an associate of at least one of the identified individuals at the relationship detection engine; and
receiving biographic information about the one or more persons of interest and at least one known associate of the one or more persons of interest at the relationship detection engine, wherein the identified relationship is between the at least one known associate of the one or more persons of interest and one of the at least one associate of the identified individuals.

5. The method of claim 1, wherein the identified relationship is between one of the identified individuals associated with one biometric sample and one of the identified individuals associated with another biometric sample.

6. The method of claim 1, further comprising receiving biographic information about associates of the identified individuals at the relationship detection engine, wherein the identified relationship is between one associate of one of the identified individuals and one associate of another of the identified individuals.

7. A biometric identification-based computing system comprising:
memory storing an application program; and
a processor configured to run the application program stored in the memory, the application program configured to:
receive, at an automated biometric identification system, one or more biometric samples of one or more persons of interest;
provide, to a biometric search engine in communication with one or more biometric records databases, the one or more biometric samples;
identify, in the biometric search engine, and at least in response to the provided one or more biometric samples, a plurality of individuals identified as potentially associated with the provided one or more biometric samples, wherein each identified individual is associated with a record including biographic information;
receive the biographic information associated with each of the identified individuals and user supplied biographic information about the one or more persons of interest at a relationship detection engine, the relationship detection engine configured to identify a relationship between the one or more persons of interest for which the one or more biometric samples were submitted and the plurality of identified individuals;
receive, from the relationship detection engine, at least in response to submitted biographic information, at least one identified relationship between the one or more persons of interest for which the one or more biometric samples were submitted and the plurality of identified individuals; and
display, on a display screen, the identified relationship, wherein the identified relationship at least improves the biometric search result by identifying the relationship between identified individuals biometrically identified with different biometric samples.

8. The system of claim 7, wherein the application program is further configured to receive biographic information about a known person of interest to the relationship detection engine, wherein the identified relationship is between at least one of the identified individuals and the known person of interest.

9. The system of claim 7, wherein the application program is further configured to receive biographic information about the one or more persons of interest and at least one known associate of the one or more persons of interest to the relationship detection engine, wherein the identified relationship is between at least one of the identified individuals and the at least one known associate of the one or more persons of interest.

10. The system of claim 7, wherein the application program is further configured to:
receive biographic information about an associate of at least one of the identified individuals to the relationship detection engine; and
receive biographic information about the one or more persons of interest and at least one known associate of the one or more persons of interest to the relationship detection engine, wherein the identified relationship is between the at least one known associate of the one or more persons of interest and one of the at least one associate of the identified individuals.

11. The system of claim 7, wherein the identified relationship is between one of the identified individuals associated with one biometric sample and one of the identified individuals associated with another biometric sample.

12. The system of claim 7, wherein the application program is further configured to receive biographic information about associates of the identified individuals to the relationship detection engine, wherein the identified relationship is between one associate of one of the identified individuals and one associate of another of the identified individuals.

13. A non-transitory computer readable information storage media having stored thereon instructions, the instructions, when executed by a processor, cause to be performed a method comprising:
    receiving, at an automated biometric identification system, one or more biometric samples of one or more persons of interest;
    providing, to a biometric search engine in communication with one or more biometric records databases, the one or more biometric samples;
    identifying, in the biometric search engine, and at least in response to the provided one or more biometric samples, a plurality of individuals identified as potentially associated with the provided one or more biometric samples, wherein each identified individual is associated with a record including biographic information;
    receiving the biographic information associated with each of the identified individuals and user supplied biographic information about the one or more persons of interest at a relationship detection engine, the relationship detection engine configured to identify a relationship between the one or more persons of interest for which the one or more biometric samples were submitted and the plurality of identified individuals;
    receiving, from the relationship detection engine, at least in response to submitted biographic information, at least one identified relationship between the one or more persons of interest for which the one or more biometric samples were submitted and the plurality of identified individuals; and
    displaying, on a display screen, the identified relationship, wherein the identified relationship at least improves the biometric search result by identifying the relationship between identified individuals biometrically identified with different biometric samples.

14. The non-transitory computer readable information storage media of claim 13, further comprising computer readable program code configured to receive biographic information about a known person of interest to the relationship detection engine, wherein the identified relationship is between at least one of the identified individuals and the known person of interest.

15. The non-transitory computer readable information storage media of claim 13, further comprising computer readable program code configured to receive biographic information about the one or more persons of interest and at least one known associate of the one or more persons of interest to the relationship detection engine, wherein the identified relationship is between at least one of the identified individuals and the at least one known associate of the one or more persons of interest.

16. The non-transitory computer readable information storage media of claim 13, further comprising:
    computer readable program code configured to receive biographic information about an associate of at least one of the identified individuals to the relationship detection engine;
    computer readable program code configured to receive biographic information about the one or more persons of interest and at least one known associate of the one or more persons of interest to the relationship detection engine, wherein the identified relationship is between the at least one known associate of the one or more persons of interest and one of the at least one associate of the identified individuals.

17. The non-transitory computer readable information storage media of claim 13, wherein the identified relationship is between one of the identified individuals associated with one biometric sample and one of the identified individuals associated with another biometric sample.

18. The non-transitory computer readable information storage media of claim 13, further comprising computer readable program code configured to receive biographic information about associates of the identified individuals to the relationship detection engine, wherein the identified relationship is between one associate of one of the identified individuals and one associate of another of the identified individuals.

19. The system of claim 7, wherein the system further comprises a hardware layer and a software layer, and the application program runs on the software layer and the hardware layer includes one or more connected elements, the elements including two or more of: storage, the display screen, a user input device, a signal bus, the memory, the processor and a network interface.

* * * * *